April 23, 1968

R. W. BRUNDAGE 3,379,007

HYDRAULIC TRANSMISSION

Filed March 23, 1966

INVENTOR.
ROBERT W. BRUNDAGE

ATTORNEYS

April 23, 1968    R. W. BRUNDAGE    3,379,007
HYDRAULIC TRANSMISSION

Filed March 23, 1966    8 Sheets-Sheet 5

INVENTOR.
ROBERT W. BRUNDAGE
BY
Meyer, Tilberry & Body
ATTORNEYS

United States Patent Office 3,379,007
Patented Apr. 23, 1968

3,379,007
HYDRAULIC TRANSMISSION
Robert Wesley Brundage, St. Louis, Mo., assignor to The Emerson Electric Mfg. Co., St. Louis, Mo., a corporation of Missouri
Filed Mar. 23, 1966, Ser. No. 536,846
13 Claims. (Cl. 60—53)

ABSTRACT OF THE DISCLOSURE

A hydraulic transmission having an improved housing design and in which a constant speed positive displacement hydraulic pump drives either of two hydraulic motors and wherein the speed of either motor may be controlled independently of the other over a wide range and in an infinite number of steps.

This invention pertains to the art of hydraulic power transmissions, and more particularly to a hydraulic power transmission capable of changing rotary motion at one speed, selectively, to rotary motion or oscillatory rotary motion and to readily vary the speed of such motion from a maximum to full stop.

The invention is particularly applicable to a power transmission for laundry machines of the type which both agitates and spin-dries the laundry and will be described with particular reference thereto, although it will be appreciated that the invention has other and broader applications.

Such laundry machines generally comprise a large tub fixed against rotation, a perforated basket within the tub, and an agitator within the basket. The tub holds water to a predetermined level, while the basket supports the clothes submerged in the water. The agitator is oscillated at somewhere between 20 and 100 oscillations per minute and moves the clothes through the water. After the clothes have been agitated a sufficient length of time, the water is pumped or allowed to drain out of the tub and the basket is then spun at speeds of between 50 and 800 r.p.m. to force the water out of the clothes by centrifugal action. The process or variations thereof may then be repeated for a number of cycles.

Such laundry machines have been normally powered by an electric motor rotating at a nominal speed of 1800 r.p.m. Belts, pulleys and/or multiple gear trains have been required to reduce the rotational speed of the motor to that of the spin speed of the basket. Additional speed reducing mechanism and crank arms have been required to reduce the speed still further to the oscillating speed of the agitator, and to change the rotational motion of the motor to the oscillating or reciprocating action required by the agitator. In addition to this, clutches, electrical solenoids to operate the clutches, brakes and electrical solenoids to operate the brakes have been required.

Such mechanical transmissions are expensive to manufacture, cumbersome in size, difficult to lubricate, wear out rapidly, become noisy and are difficult to maintain or repair.

My copending application, Ser. No. 303,905, filed Aug. 23, 1963, now Patent No. 3,242,703, issued Mar. 29, 1966, solved many of these problems by providing in a single composite unit an electric motor driving a hydraulic pump which in turn energized hydraulic motors through a valve which unit was far more economical to manufacture, much more compact and gave an improved efficiency of washing action over either mechanical or hydraulic laundry transmissions heretofore known. The present application describes improvements to that copending application.

Thus in order to satisfy the increasing demands on laundry machines, the maximum capacity thereof has recently been increased. This has presented problems for now in order to handle loads substantially smaller than the maximum load capacity, variable speeds of agitation or of rotation of the basket or both are required. Heretofore in mechanical transmissions this has required an expensive multiple speed electric drive motor or an expensive variable speed power transmission. The said copending application permitted only a limited range of speed variation.

A further problem with the earlier transmission resulting from the increased capacity was that of dissipating the heat generated by power losses therein. Due to the small size of the transmission, insufficient area was present to radiate or convect heat to the surrounding atmosphere.

The said earlier transmission was comprised of a two-piece housing wherein all of the principal passages for conducting the fluid from the pump to the motors were formed in the mating surfaces of the housing prior to bringing the surfaces into abutting engagement. Also, the valve member was in the plane of these abutting surfaces. Such an arrangement limited the range of hydraulic circuitry available because of the difficulty of providing crossovers and of conducting fluid past the valve member without going through the valve member.

A still further problem has been in eliminating the danger of damage to the moving parts due to dirt particles which were not filtered out from the oil at the time that the transmission was filled or particles which were not fully flushed out of the housing following the manufacturing and machining operations.

The present invention contemplates a transmission which overcomes all of the above referred to difficulties and others and provides a transmission which can have a maximum complexity of hydraulic circuits, which has means for trapping dirt particles which might become entrained in the hydraulic fluid, which has an infinite control over the speed of agitation or spin from maximum to zero, and which has a maximum capacity for a minimum size.

In accordance with one aspect of the present invention, a hydraulic transmission is provided particularly adapted for laundry machines comprised of a two-piece housing having surfaces in sealed abutting relationship, such surfaces prior to assembly of the housing having the fluid passages of the transmission formed therein along with deeper valve cavities and the valve member chamber is formed in the housing offset from the abutting surfaces and intersecting the cavities whereby fluid passages in the abutting surfaces can circumvent any desired valve member.

Further in accordance with the invention, hydraulic pumps and/or motors are provided wherein at least one of all relatively moving surfaces are provided with one or a plurality of recesses extending transversely to the relative direction of movement and freely communicating with a fluid containing passage or port, such recesses in the aggregate extending transversely generally across the entire width of the surfaces. Where a pressure differential exists transversely between the edges of the surfaces, the passage is divided into two portions each extending part way across the surface and spaced from each other in the direction of the line of movement. Dirt which happens to get between two moving surfaces moves to a recess and reenters the fluid stream.

Still further in accordance with the invention, the housing surrounding the pump is provided with a plurality of fins and the electric motor driving the pump has a diameter substantially larger than the pump and is provided with a fan which draws cooling air over the fins and outwardly through ports in the motor housing and over the remainder of the transmission housing for cooling same.

Still further in accordance with the invention, a hydraulic transmission is provided comprised of a pair of housing members having surfaces in sealed abutting relationship, such surfaces being provided with a plurality of recesses, such recesses including the passages for communicating the pump with the motor and a large recess of substantial vertical height for providing the sump for the transmission whereby the walls of the sump contribute to the structural rigidity of the housing.

Further in accordance with the invention, an arrangement for varying the speed of movement of a positive displacement hydraulic motor driven by a constant-speed, positive-displacement hydraulic pump is provided wherein the discharge fluid from the hydraulic motor is flowed through a metering orifice, preferably adjustable, and the pressure created in the discharging fluid actuates a valve member bypassing or dumping hydraulic fluid from the motor inlet to the pump inlet.

The principal object of the invention is the provision of the new and improved hydraulic transmission which is economical to manufacture, efficient in operation and will have a maximum service life with a minimum of maintenance.

Another object of the invention is the provision of a new and improved arrangement for removing the heat generated in a hydraulic transmission.

Another object of the invention is the provision of a new and improved location for the hydraulic passages and the valve passages of a hydraulic transmission which enable a maximum flexibility and complexity in the hydraulic circuits employed.

Another object of the invention is the provision of a new and improved arrangement for controlling the speed of movement of a positive displacement hydraulic motor driven by a constant speed positive displacement hydraulic pump wherein the speed may be readily varied from zero to maximum in an infinite number of steps.

Another object of the invention is the provision of a new and improved arrangement for varying the speed of such a motor wherein a minimum amount of energy is wasted in such speed control.

Still another object of the invention is the provision of a new and improved arrangement for controlling the speed of such a motor wherein the effect of leakage in the motor on the speed control is minimized.

Another object of the invention is the provision of a new and improved speed control circuit for wash and spin cycles wherein there is no interaction between the two cycles even though they both use a common pump.

Another object of the invention is a hydraulic transmission that does not require the use of a filter for the hydraulic fluid.

Another object of the invention is the provision of a new and improved hydraulic transmission wherein any dirt entrained in the hydraulic fluid which happens to work its way between relatively moving surfaces is trapped and fed back into the moving oil where it can ultimately settle out into the sump tank.

Another object of the invention is the provision of a new and improved design for the housing of a hydraulic transmission wherein the sump is formed integrally within the housing providing a housing with a maximum rigidity.

Still another object of the invention is the provision of a new and improved hydraulic transmission particularly adapted for laundry machines having a constant volume hydraulic pump energizing either an agitator motor or a spin motor and wherein the speed of either motor may be controlled independently of the other.

Another object is the provision of a new and improved hydraulic transmission having two motors wherein either motor may be selectively energized by selecting the direction of rotation of an electric drive motor and the speed of either motor can be individually controlled.

Another object of the invention is the provision of a new and improved hydraulic transmission particularly adapted for laundry machines of the type described having a constant volume hydraulic pump energizing either an agitator motor or a spin motor and wherein the speed of either motor may be readily controlled by providing a bypass from the pump output to input proportional to the motor speed.

A further object of the present invention is the provision of a new and improved hydraulic transmission particularly adapted for laundry machines which never needs lubrication by maintenance personnel.

Another object of the invention is the provision of an integrated power transmission unit for laundry machines which is free of all belts, pulleys and external mechanical brakes and clutches.

Another object of the invention is the provision of a new and improved transmission particularly adapted for use with laundry machines which while permitting full variation in the speeds of operation of the machine, employs a low cost single speed electric motor as a power source.

Still another object of the invention is the provision of a hydraulic transmission for laundry machines and the like wherein all operating parts may be completely sealed in a single housing.

The invention may take physical form in certain parts and arrangements of parts, a preferred embodiment of which will be hereinafter described in detail in this specification and illustrated in the accompanying drawings which form a part hereof and wherein:

FIGURE 1 is a cross-sectional view of a hydraulic transmission illustrating a preferred embodiment of the invention taken approximately on the line 1—1 of FIGURES 3–7, it being noted that the plane through the various figures is shifted slightly to better illustrate the portions of a transmission which FIGURE 1 is attempting to show;

Figure 2:
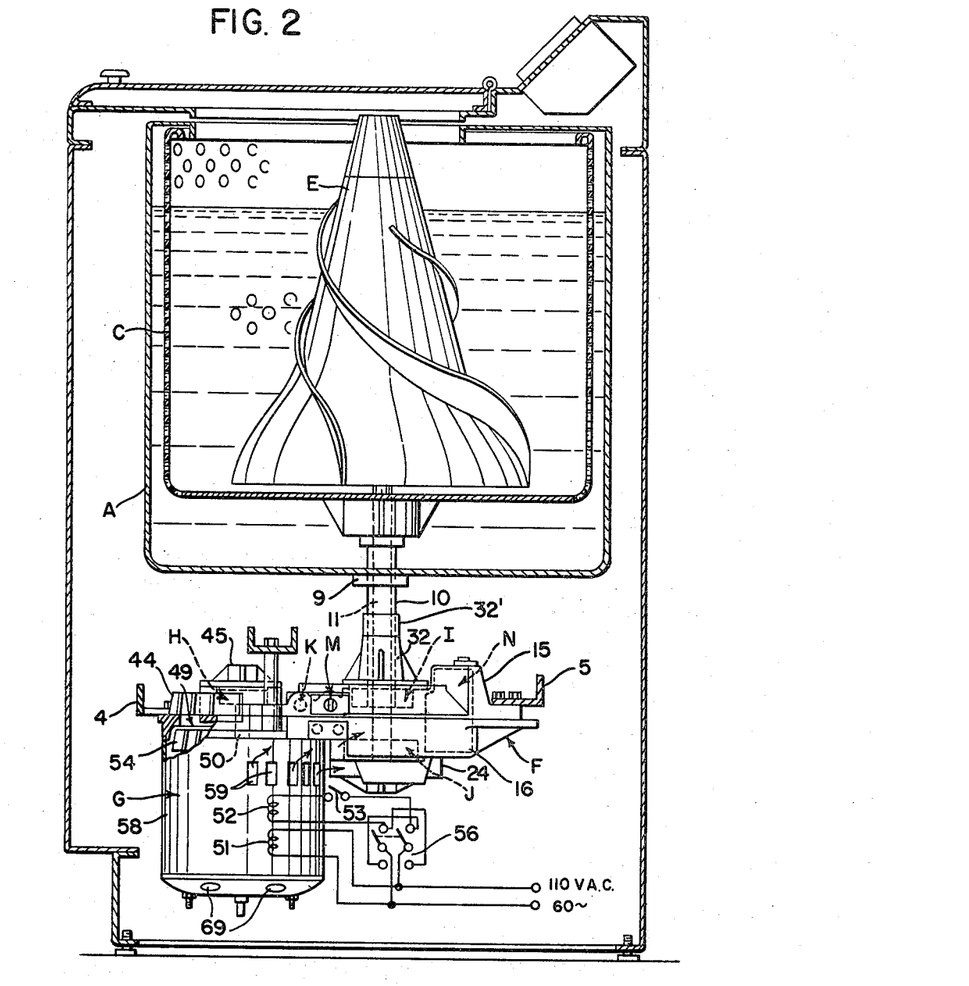
FIGURE 2 is a side cross-sectional view showing the transmission in operative relationship of the elements of a laundry machine.

Referring now to the drawings, wherein the showings are for the purposes of illustrating a preferred embodiment of the invention only, and not for the purposes of limiting same, FIGURE 2 shows, somewhat schematically, a laundry machine comprised of a tub A, a perforated basket C concentrically arranged in the tub and an agitator member E concentrically arranged within the basket and arranged to be oscillated and agitate the clothes within the basket. Positioned immediately below the tub A and supported relative thereto is the hydraulic transmission of the present invention comprised generally of a housing F, an electric motor G driving a hydraulic pump H, a hydraulic spin motor I mechanically coupled to the basket and adapted to spin same when energized, a second hydraulic motor J mechanically coupled to the agitator E and adapted to oscillate same when energized. Valve means K within the housing selectively control the flow of fluid through suitable passages provided in the housing from the pump to either of the two motors, all as will be hereinafter described. Throttle valves L and M (see FIGURE 3) control the speed of the spin and agitate motors I, J, respectively. The housing F also defines a sump N.

LAUNDRY MACHINE

The laundry machine per se forms no part of the present invention and is shown solely for the purpose of illustrating how the transmission of the present invention may be applied to such a machine. Thus, the tub A may take any known or desired shape as is required for the washing. Suitable means, not shown, may be provided for supplying water to, or removing such water therefrom. Normally, the tub A is supported on legs, not shown, which extend to the bottom of the machine, and are then pivotally mounted so that the tub and all the rest of the mechanism may move slightly from side to side to absorb unbalanced forces created by centrifugal force on unequal distribution of clothing within the basket C during the spin cycle.

The basket C may also take any desired form or shape, but is generally perforated so that the water may pass freely into and out of the basket, so that the water in the clothing may be centrifuged thereout during the spin cycle. In another type of machine the basket walls are solid and the water is spun over the top to separate it from the clothes. This basket is supported for rotation upon a hollow shaft 10, which passes downwardly through a water-seal bearing 9 in the lower part of the tub A into the housing F of the transmission as will be hereinafter described.

The agitator E also may be of any desired shape or construction and is supported for oscillation on a shaft 11 positioned within the shaft 10 and extending upwardly beyond the upper end of the shaft 10, where it is fastened to the agitator E in any desired manner. This shaft 11 is rotatably supported in the shaft 10 by means of a bearing sleeve 12 pressed into the inside of counterbores on the inside of shaft 10 and extends downwardly through and beyond the lower end of the shaft 10 where it is releasably keyed to the agitator motor J as will be described. A bearing 14 rotatably supports shaft 11 at the parting line of the housing F.

HOUSING

The housing F is mounted relative to the tub A by brackets 4, 5 and resilient shock mounts, not shown. In the embodiment shown the housing F is comprised of two main members of cast aluminum, an upper housing member 15 and a lower housing member 16 having lower and upper surfaces 15a, 16a respectively, which surfaces as will appear, have recesses defining the hydraulic circuit of the transmission as well as the sump N. Keys 6, 7 align the two members. In accordance with one aspect of the invention, these surfaces are cemented together by means of an epoxy cement such as manufactured by the Minnesota Mining and Manufacturing Co. under the trade name of EC 2080. This cement is roll coated onto the surfaces and the two members are heated to the cement curing temperature of approximately 300° F. while tightly clamped together. Conventional bolts may be employed at an increase in size of the housing and increased cost.

The surfaces 15a, 16a on the right side of the housing F have two deep recesses 17, 18 in the shape of a semicircle which define the sump N. The overall length of the sump N is preferably at least equal to or greater than the vertical height of the remainder of the housing. The walls defining this sump N contribute to the overall rigidity of the housing.

Figure 1:
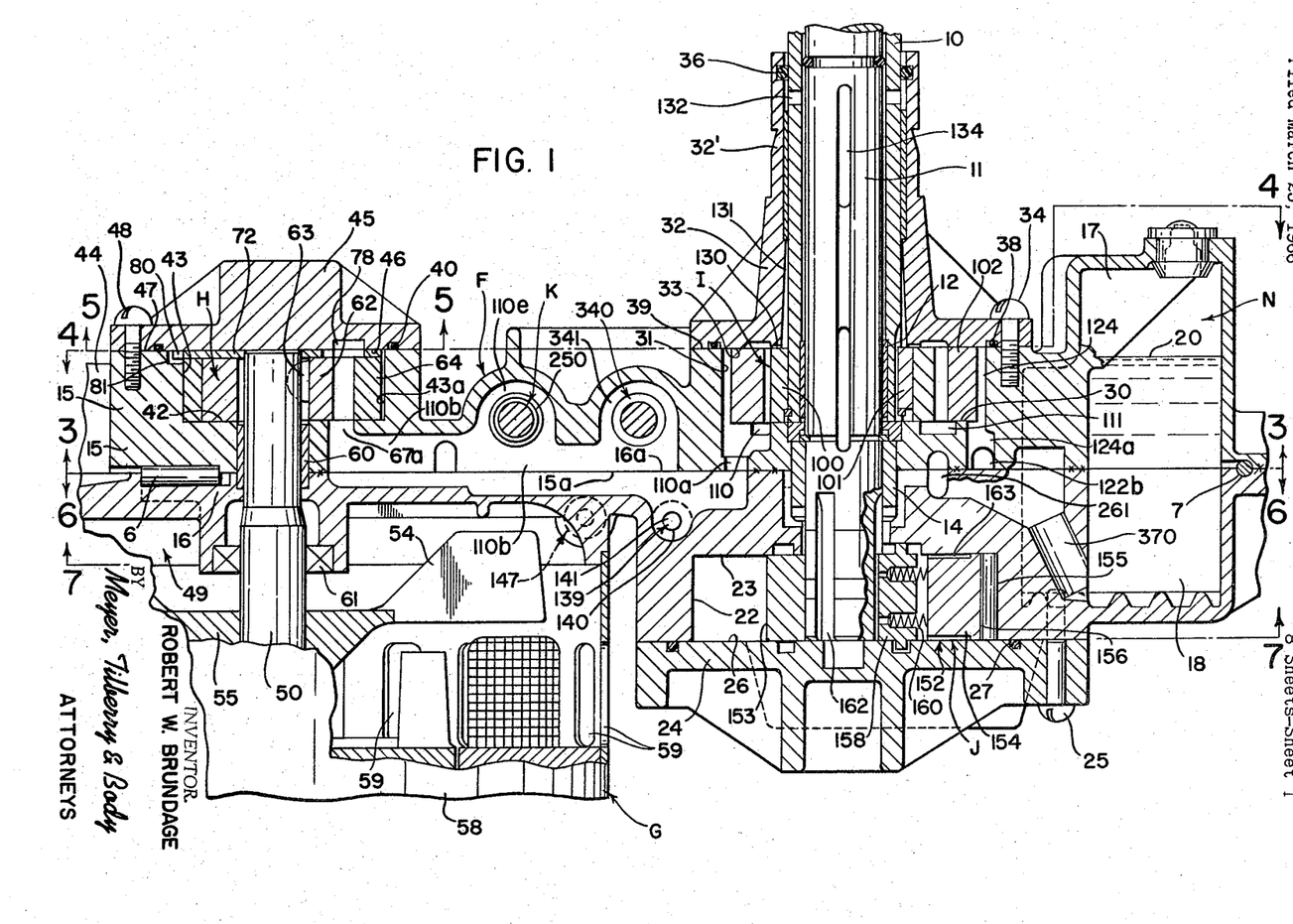

The lower side of the lower housing 16 on the right hand side as viewed in FIGURE 1 has a cylindrical recess having a flat upper surface 23 and an inner cylindrical surface 22 which surfaces define a cavity for the agitator motor J. The axis of the surface 22 is parallel to and coincident with the axis of the shafts 10, 11. The lower side of the recess is closed by a cap 24 fastened to the housing by suitable fastening means, such as the screws 25, and has an upper surface 26 with a recess therein to receive an O-ring seal 27.

In a similar manner, the upper surface of the upper housing member 15 has a recess defined by a flat surface 30 and a cylindrical surface 31 to define the housing for the basket spin motor I. The cylindrical surface 31 has an axis parallel to, but slightly offset from, the axis of shaft 11. A cover plate 32 having a lower surface 33 completes the motor housing and is fastened to the upper surface of the upper housing 15 by suitable fastening means, such as the screws 34. This cover plate has an upwardly extending cylindrical column 32' having an inner cylindrical passage through which the shaft 10 extends. An O-ring seal 36 positioned in a groove in the upper end of the cylindrical passage of the column 32' and bearing against the outer surface of the shaft 10 provides a seal at this point.

The plate 32 also has a small cylindrical groove in which an O-ring 38 is positioned to seal against an opposing flat surface 39 on the upper surface of the upper housing 15.

The upper surface of the upper housing 15 on the left hand side also is provided with a cavity for the pump H defined by a lower surface 42 and an inner cylindrical surface 43. This recess is then closed by a cap 45 having a lower surface 46 abutting with an upper surface 47 of the housing 15 which cap 45 is suitably fastened to the housing by any suitable means, such as screws 48. An O-ring 40 in a cylindrical groove in surface 46 effects a hydraulic seal.

The cylindrical surface 43 has an axis parallel to but slightly offset from the axis of a shaft 50 extending upwardly through the lower housing 16 from the motor G. The housing member 15 on the left end surrounding half of the pump cavity has a plurality of radially extending cooling fins 44. The lower housing member 16 on the left end is formed to provide an end bell for the motor G and has a plurality of ventilating openings 49 aligned with the fins 44.

MOTOR

The motor G is the power source which powers the entire transmission unit. It may take any one of a number of known forms, but by virtue of the features of the transmission may be a single-phase, constant-speed A.C. motor of the split phase type. Such a motor is much less expensive than the high starting torque motors conventionally required in laundry machines today.

The motor G conventionally has a running winding 51 and a starting winding 52 which is disconnected by a centrifugal switch 53 operatively associated with the motor shaft 50. One of these windings is connected to an alternating current power source through a polarity reversing switch 56 so that depending upon the position of the switch 56 the motor may be made to start in either direction. A blower fan 54 is mounted on shaft 50 above the motor rotor. Shaft 50, where it passes through the housings 15, 16, is rotatably supported in a suitable bearing sleeve 60. An oil seal 61 is also provided.

The motor housing 58 on its right hand side and generally aligned with the lower surface of housing member 16 has a plurality of air passages 59 therethrough. Additional openings 69 are in the lower part of the motor housing. The fan 54 thus sucks cooling air over the fins 44, and then blows it across the lower side of the housing member 16 as well as over the motor windings 51. This cooling arrangement is very beneficial in keeping the temperature of the hydraulic fluid within maximum limits and is believed to be novel.

PUMP

The pump H may take a number of different forms, e.g., a reciprocating piston type pump, a rotating vane type pump, or the like; but in the preferred embodiment, an internal gear type pump is employed comprised of an externally toothed gear 62 keyed to the shaft 50 by means of a key 63 and an internally toothed ring gear 64 rotatably supported by the cylindrical surface 43 on an axis slightly spaced from that of the gear 62. Vertical groove 43a provides a source of lubrication fluid. As is conventional, the ring gear 64 has one tooth more than the internal gear 62 and the teeth of these gears are in sliding sealing engagement to provide a plurality of pumping chambers which progressively increase and decrease in volume. Hydraulic fluid is sucked into and forced out of these chambers, depending on whether the volume is increasing or decreasing.

The lower surface 42 of the pump cavity is recessed to provide two manifolds 66, 67, having ports 66a, 67a extending downwardly therefrom into communication with passages 66b, 67b, respectively formed in the abutting surfaces of the housing members 15, 16. These manifolds 66, 67, are generally arcuate and are positioned a distance from the axis from the shaft 50 such as to communicate with the chambers of the gears 62, 64 as they rotate. The arcuate ends of the manifolds 66, 67 are circumferentially spaced from each other so that the surface 42 between the ends of ports forms the pump lands, it being noted that the entire surface 42 (and these lands) are in sliding sealing engagement with the lower surfaces of the gears 62, 64 to thus seal the chambers, one from the other, except where by virtue of a manifold overlapping one or more chambers, they are in communication.

Figure 3:
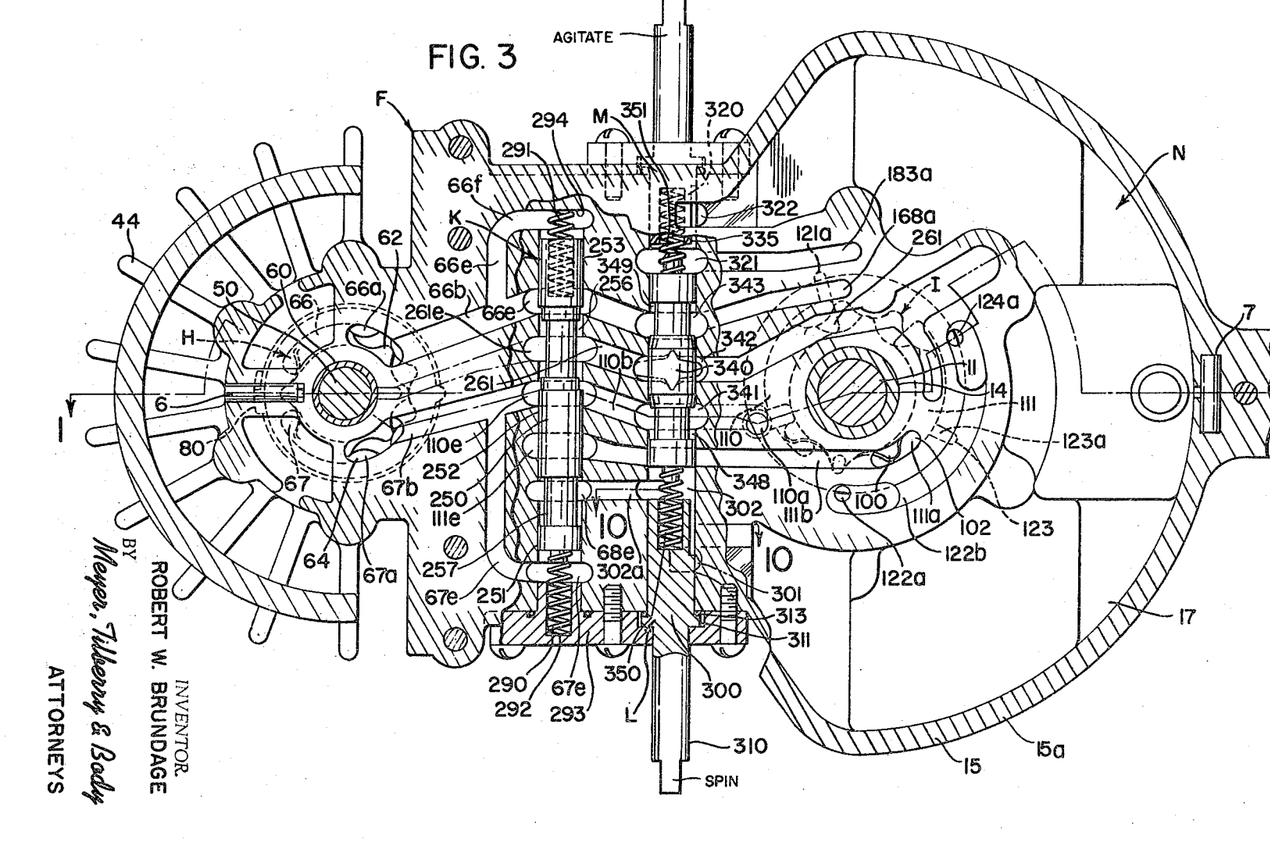
FIGURE 3 is a cross-sectional view of FIGURE 1 taken approximately on line 3—3 thereof and in effect is a view looking upwardly, the valve member being shown in the neutral position when the pump is not operative.
Figure 4:
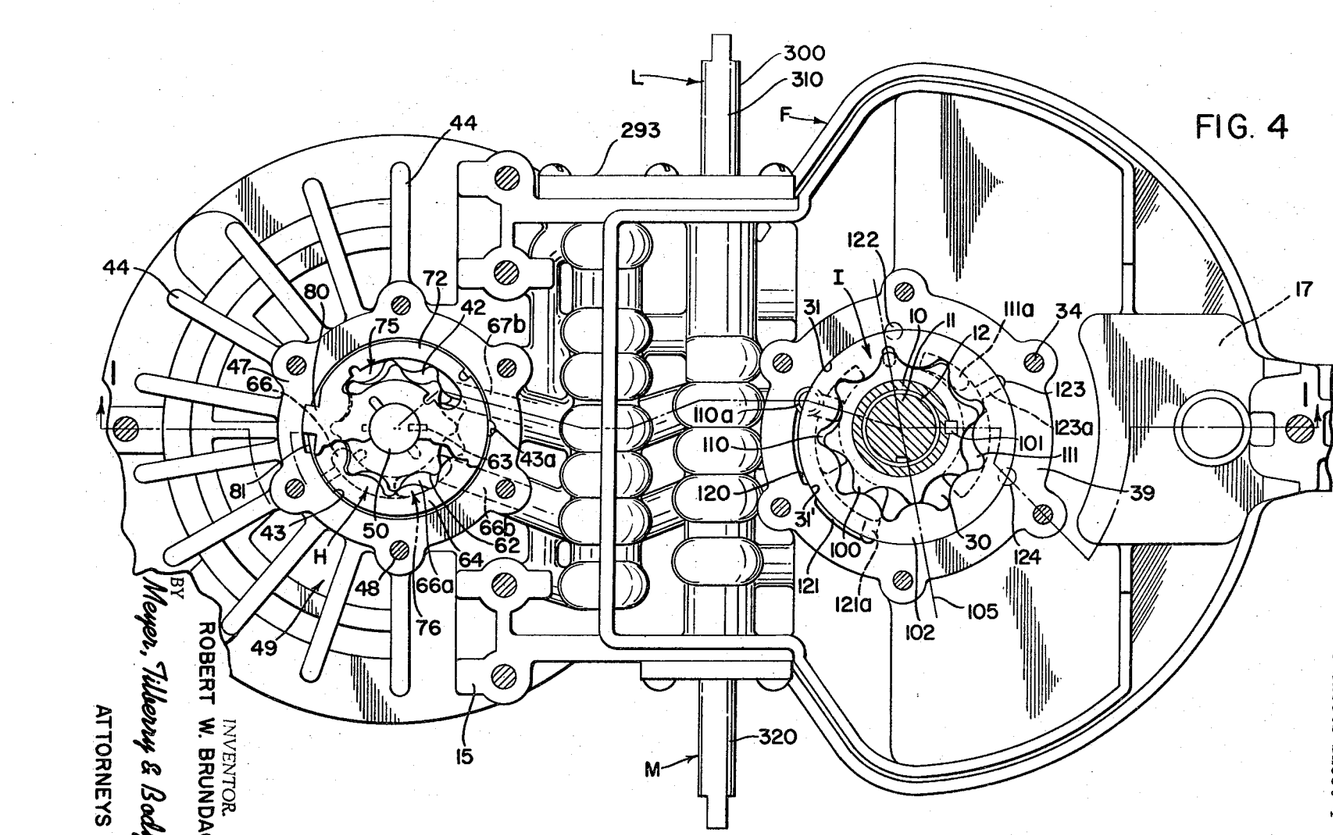
FIGURE 4 is a top elevational view of FIGURE 1 taken approximately on the line 4—4 thereof and with the pump and spin motor covers removed for the purpose of clarity.

The neutral axis of the gears 62, 64 in relation to the arcuate ends of the manifolds 66, 67, and the corresponding lands is as shown in FIGURES 3 and 4, it being noted that the center line of the lands is offset from the gear neutral axis a small amount in the direction of rotation of the pump for supplying fluid to the agitate motor.

The pump H includes manifold plate 72 located on top of the gears 62, 64 and having a lower surface in sealing engagement with the upper surface of the gears 62, 64, and an upper surface in sealing engagement with the lower surface of cap 45. This manifold plate 72 has (FIGURES 5, 5a) two arcuate manifolds 75, 76 extending therethrough the ends of which are separated by portions of the plate which may be called lands. The ports are spaced from the axis of rotation of the shaft 50, such that they communicate with the chambers of the gears 62, 64 as they revolve.

The manifold plate 72 is movable through an arc limited by a tab 80 one the plate 72 extending into an arcuate recess 81 in the cylindrical wall 43. This manifold plate 72 frictionally engages the gears 62, 64 and shifts from one position to the other depending on the direction of rotation of the gears 62, 64. The effect is to change the manifolding characteristics of the pump for each direction of rotation. The shifting of this plate is described in copending application Ser. No. 396,873, filed Sept. 16, 1964, now abandoned. The lower surface of cap 45 is provided with a pair of arcuate recesses 74, 78 corresponding in shape and length to the manifolds 75, 76. The hydraulic pressure, in whichever manifold 75 or 76 happens to be at high pressure depending on the direction of pump rotation, creates a downward axial force on the gears 62, 64 generally equal and opposite to the upward axial force created by the pressures in the manifold 66 or 67 as the case may be.

SPIN MOTOR

The basket or spin motor I may take a number of different forms, e.g., a vane motor, but in the preferred embodiment is comprises generally of externally toothed gear 100 keyed for rotation to the shaft 10 by means of a key 101, and an internally toothed ring gear 102 mounted for rotation in the cylindrical wall 31, on an axis spaced from the axis of rotation of the gear 100 and thus the shaft 10. The ring gear 102 has one tooth more than the gear 100, and the teeth are in sliding sealing engagement to form a plurality of chambers, which progressively increase and decrease in volume as the gears rotate. These gears have a neutral axis 105 as is shown in FIGURE 4.

The lower surface 30 of the recess is in sliding sealing engagement with the lower surface of the gears 100, 102 and has arcuate extending inlet and outlet manifolds 110, and 111, respectively, formed therein spaced from the axis of rotation so as to communicate with the increasing and decreasing volume chambers of the gears. The inlet manifold 110 has a port 110a extending downwardly to communicate with a passage 110b formed in the abutting surfaces of the housing members 15, 16. Likewise the outlet manifold 111 has a port 111a, extending downwardly to communicate with a passage 111b also formed in the abutting surface.

The surface 30 in between the arcuate ends of the manifolds 110, 111 is in sliding sealing engagement with the lower surface of the gears 100, 102, and functions as the lands of the basket motor I. These lands have an arcuate width at least equal to the arcuate width of the gear chambers at their maximum arcuate width to thus prevent communication from one manifold port 110 to the other manifold port 111 through the chambers.

In the embodiment shown, the cylindrical surface 31 has a pair of spaced recesses 120, 121 separated by a land 31' on the high pressure chamber side of the neutral axis 105. Recess 120 communicates directly with inlet port 110a while recess 121 communicates with inlet manifold 110, grooves 121a in the surface 30. The recesses are thus at high pressure and the force of this pressure counterbalances the forces of the high pressure in the motor chambers.

In a like manner a groove 123 is located on the low pressure chamber side of the neutral axis adjacent the mid-point and communicates with the discharge manifold 111 of the motor I, which is at discharge pressure, through groove 123a, in the surface 30. There is thus a steep pressure gradient of hydraulic fluid circumferentially in the clearance between the outer surface of the ring gear 102 and the surface 31.

Grooves 122, 124 are each located on the low pressure side of the neutral axis approximately midway between the neutral axis and the groove 123 and are intercommunicated by ports 122a, 124a and passage 122b formed in the surface 15a. These grooves 122, 124 have the function of equalizing the pressure gradient between recess 120 and groove 123, and recess 121 and groove 123.

This pressure balancing and equalizing is described and claimed in copending application, Ser. No. 373,761, filed June 9, 1964.

A pressure relief valve indicated generally at 139 is associated with the pressure side of the spin motor I to prevent the build up of excessive pressures at the time when the spin motor is initially energized to rotate or in the event that rotation of the motor or the basket is prevented for any reason. The pressure relief valve may take a number of different forms, but in the embodiment of the invention shown is comprised of a valve member 141 held against a valve seat 142 by a helical coiled spring 143 positioned in a hole 144 and bearing at one end against the member 141 and at the other end against a protrusion 146 on a cap 148 fastened to the side of the housing F and closing the hole 144. This hole 144 is communicated to the sump N through suitable passage 149. The pressure side of the member 141 is communicated to the motor inlet passage 110 through a passage 140.

A further pressure relief valve 147 of similar construction maintains a controlled back pressure on the discharge passage 111b when discharge of fluid is blocked by the valve K to brake the spin motor I and the basket C to a stop. Design or adjustment of this valve controls the rate of braking of the basket C.

AGITATOR MOTOR

The agitator motor J is identical (with exceptions hereinafter noted) to that described in copending applications, Ser. No. 303,905, which issued into Patents No. 3,242,703 on Mar. 29, 1966, and Ser. No. 335,777, filed Jan. 6, 1964, now Patent No. 3,291,006, issued Dec. 13, 1966, and will not be described in detail. Generally the motor is comprised of a piston 152 made up generally of a central hub 153, and a vane 154. The vane 154 has a vertical groove 156 in its outer radial end in which a steel roller 155 is loosely mounted having an axial length such as to sealingly and slidingly engage the upper and lower surfaces 23, 26 of the agitator motor housing.

The hub 153 is releasably keyed to the shaft 11 by means of a key 158 slidable in a slot 159 and pressed radially inwardly by a spring 160 to engage one of preferably three-equi-angularly spaced key-ways 162 in the shaft 11. The principal change is that the upper and lower surfaces of vane 154 are provided with dirt trap grooves 163 extending radially from slot 159 toward but spaced from groove 156. The grooves 163 communicate with the sump N through key slot 159 and keyways 162.

A toggle action valve is provided comprised of a member 165 of a thickness such that its upper and lower surfaces are in sliding, sealing engagement with the surfaces 23, 26; that is to say, its axial length is the same as that of the piston 152. This member 165 is pivoted about an elemental axis 166 substantially spaced from the axis of rotation of the shaft 11. On the line between such axis, a port 168 in the upper surface 23 extends upwardly to communicate with a passage 168a in the abutting housing surfaces and provides the fluid inlet for the motor J.

A pressure relief valve, not shown, communicates the passage 168a to the sump.

A pair of discharge ports 183, 184 are provided in the lower surface 23 which extend upwardly through the lower housing 16 to communicate with passage 183a, in the abutting surfaces of the housing members 15, 16 and thence to valve chamber 321.

SHAFT LUBRICATION

The shafts are lubricated by bleeding off a small amount of fluid from the high pressure chambers of the spin motor I through the following hydraulic circuit: radial groove 130 in the surface 33 of the plate 32; clearance 131 between the inner surface of the column 32' and the outer surface of shaft 10; radial passages 132, located just below the O-ring seal 36; dirt-trap groove 134 on the surface of shaft 11 to bearing 14 which communicates with the oil reservoir.

VALVE

The valve K has three positions; namely, neutral (FIGURE 3), agitate (FIGURE 8), and spin (FIGURE 9) and performs in each position a number of different functions.

In the neutral position, the valve K communicates the discharge of pump H to its inlet and blocks the discharge of basket spin motor I.

In the agitate position, the valve K directs the discharge of pump H to the inlet of agitator motor J, and at the same time blocks the flow of fluid to and from the basket spin motor I.

In the spin position, the valve K communicates the discharge of pump H (which in the preferred embodiment is rotating in the opposite direction from the agitate position) with the inlet of the spin motor I and the discharge of spin motor I to speed control M and thence to the sump N. The valve K in this position also communicates the inlet of the agitator motor J to the sump N.

The valve K may take any one of a number of different forms, and may be made up of a plurality of independent valves operated by external power means, e.g., solenoids and the like, but in the preferred embodiment and in accordance with one aspect of the invention, the valve K is comprised of a single unitary valve piston 250, reciprocable in a valve cylinder on a line of movement between the axes of the pump H and the motors I, J, and in accordance with the invention offset from the parting line between the upper and lower housings 15, 16. In the embodiment shown, the cylinder for the piston 250 is formed in the upper housing member 15, spaced from the surface 15a thereof.

The piston 250 (reading from bottom to top in FIGURE 3) has spaced lands 251, 252, 253 separated by portions of reduced diameter forming valve passages 256, 257. The valve cylinder in a similar manner has spaced lands separated by portions of enlarged diameter forming valve chambers 67e, 68e, 111e, 110e, 261e, 66e, 66f. Chambers 67e, 110e communicate at all times with pump manifold 67. Chambers 66f, 66e communicate at all times with pump manifold 66. Chamber 261e communicates at all times with sump passage 261.

The ends of the piston 250 are counterbored at each end and a pair of helical coil springs 290, 291 fit one into each of the counterbores. The spring 290 bears at its opposite end against the base of a bore 292 in a cap 293 which closes the valve cylinder at the right end. The spring 291 bears at its opposite end against the base 294 of the chamber 66f. These springs 290, 291 are identical and operate to return the valve piston 250 to the neutral position as shown in FIGURE 3.

SPEED CONTROL

The speed of movement of the spin and agitator motors I, J is controlled by throttle valves L, M, respectively, one comprised of a throttle valve member 300, and the other comprised of a throttle valve member 320 and a common hydraulically actuated dump valve member 340, which dump valve member 340 cooperatively functions with either valve member 300 or 320. Obviously, two dumping valve members could be provided, one to cooperate with each of the throttle valve members.

The three valve members 300, 320, 340, may be separately located within the housing and intercommunicated by appropriate passages, but in the preferred embodiment, these members are all positioned within a common cylindrical bore extending transversely through the housing between the pump H and the motors I, J, on an axis parallel to the axis of the valve K (and surface 15a) and in accordance with the invention, offset from the parting line between the upper and lower housings 15, 16. This bore could be in either the upper or lower housing 15, 16 but in the embodiment shown, is in the upper housing 15. The bore reading from bottom to top has spaced lands separated by portions of enlarged dimensions forming valve chambers 301, 302, 341, 342, 343, 321, 322. Chamber 342 communicates with the sump N at all times through sump passage 261. Chambers 341, 343 communicate with pump manifolds 67, 66 respectively.

Figures 5, 5A, 8:
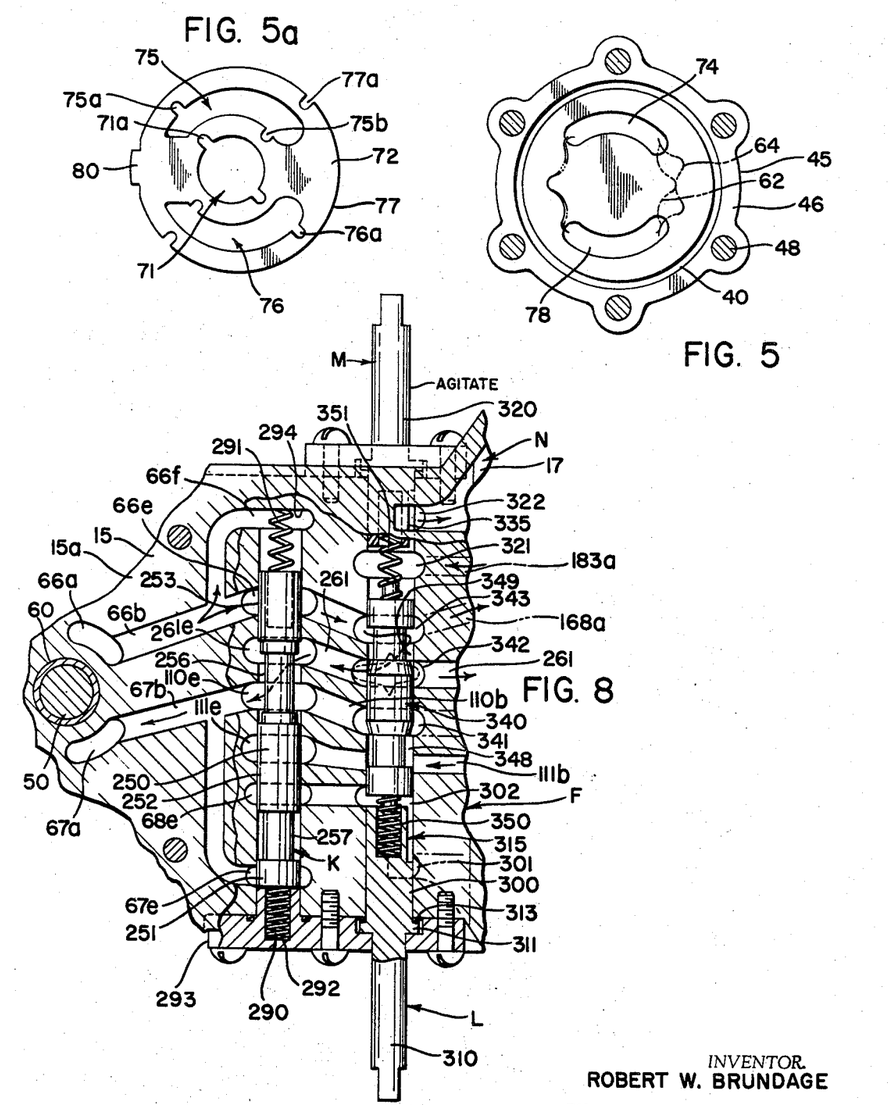
FIGURE 5 is a cross-sectional view of FIGURE 1 taken approximately on the line of 5—5 thereof and in effect is a bottom plan view of the pump cover with an outline of the gear pumping members superimposed thereon in dotted lines.
FIGURE 5a is a top plan view of the manifold plate.
FIGURE 8 is a cross-sectional view showing the valve member in a position to deliver hydraulic fluid to the agitate motor with the speed control adjusted for the motor to operate at a fraction of its maximum speed.
Figures 9, 10:
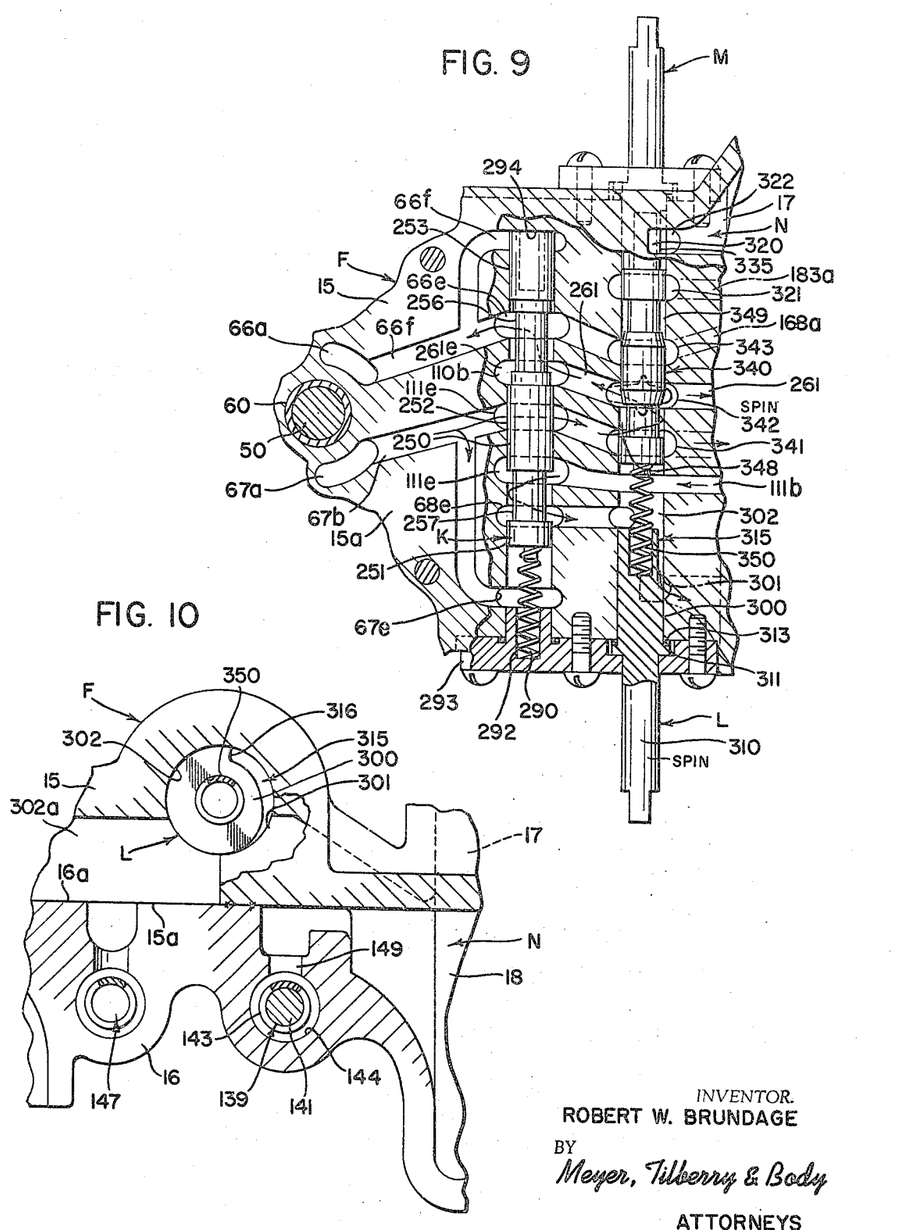
FIGURE 9 is a view similar to FIGURE 8 but showing the valve member in a position to supply hydraulic fluid to the spin motor and with the speed control set for the spin motor to operate at a fraction of its maximum speed.
FIGURE 10 is a fragmentary cross-sectional view of FIGURES 3 and 6 taken approximately on the line 10—10 thereof and showing the throttle in the partial speed position.

The dump valve member 340 in turn is a generally elongated cylindrical member having spaced lands separated by portions of reduced diameter forming valve passages 348, 349. These lands are so spaced that when the dumping valve member is in the neutral position shown in FIGURE 3, valve chambers 341, 342 and 343 are sealed from each other. When the dumping valve member 340 moves down as shown in FIGURE 8, chamber 343 is communicated with sump chamber 342 through passage 349 and when the member moves up as is shown in FIGURE 9, chamber 341 communicates with sump chamber 342 through passage 348.

Dump valve member 340 is held in the neutral position shown in FIGURE 3 by identical helical springs 350, 351 bearing at one end against the base of a counterbore in the end of valve members 300, 320 respectively.

Throttle valve members 300, 320 are identical in construction and only valve member 300 will be described in detail. Thus, valve member 300 is rotatably supported in the same passage with dump valve member 340 and has a shaft 310 extending outwardly through an opening in cap 293. A flange 311 on one side rotatably engages the base of a counterbore in the cap 293 and on the other side an O-ring seal 313.

The throttle valve member 300 is so arranged that when it is moved, in this case rotated, it will provide a variable width passage or orifice communicating chamber 302 with chamber 301. As will appear, the entire discharge from spin motor I flows from valve chamber 302 through this orifice to chamber 301 and thence to the sump. Valve chamber 301 has an arcuate extent around the valve member 300 of only 180°. The other valve chambers 341, 342, 343, 321 preferably surround the bore for 360°.

In the embodiment shown, valve member 300 has a recess 315 on its left hand end over approximately 170° of its circumference and of an axial length to communicate with chamber 301 when throttle valve member 300 is properly positioned. This progressively becomes radially deeper from one end toward the other and terminates in an abrupt radially extending surface 316. By controlling the shape of this recess, a linear variation in the speed of the motors in relation to the angular movement of the valve member 300 may be obtained. While any shape of recess may be employed, the one shown in FIGURE 10 is preferred.

The valve member 320 is identical in construction to the valve member 300 and has an identical recess 335 in its surface for adjustably communicating valve chamber 321 with valve chamber 322.

HOUSING PASSAGES AND VALVE CONFIGURATION

In the embodiment of the invention shown, it will be noted that all passages for communicating hydraulic fluid to and from the pump F, motors I, J, and sump N are formed in the abutting surfaces 15a, 16a prior to the time that the upper and lower housing members 15, 16 are assembled and cemented together. Additionally, the two bores for the valves K, L, M are offset from the plane of the surfaces 15a, 16a. With this arrangement, it is possible to have hydraulic fluid flow past one of the valve member bores without communicating therewith. Also, the parting line between the surfaces 15a, 16a, does not intersect with the valve member bores so that the lands of the valve member bores may be continuous and not interrupted by a layer of cement as would be the case in my copending application, Ser. No. 303,905, filed Aug. 22, 1964.

Preferably at the time of manufacture the passages in the surfaces 15a, 16a are cast into these surfaces along with deeper recesses at the location of the various valve chambers. Subsequently, the housing is drilled to form the valve member bores on a line which intersects with the deeper recesses. Thus, the valve chambers inherently communicate with the abutting surfaces of the housing and with whatever passages happen to be aligned with these deeper recesses. Obviously, the valve member bores could be bored and then the valve chambers machined by entering through the surface 15a.

LEAKAGE FLUID

The motors I, J, leak some of the hydraulic fluid between the various moving surfaces for the purpose of lubrication and force balancing which fluid would ordinarily be communicated to the motor discharge ports or passages and thence back to the pump or sump. In a no-leakage hydraulic motor, the volume of fluid flowing through the discharge passages in a given unit of time is an exact indication of the speed of the motor. To the extent that the motor has internal leakage which is communicated to the discharge passage, the volume of fluid flowing in the discharge pasage is not a true indication of the speed of the motor. Inasmuch as the present invention meters the discharging fluid from the motors I, J for the purpose of controlling the speed thereof, in accordance with the invention, the leakage fluids of the motors I and J are communicated directly to the sump N and do not commingle with the fluids discharging from the motors through their normal discharge ports. Thus, the surfaces 15a, 16a are provided with a sump passage 261 which extends as is shown in FIGURE 3 from the pump shaft 50 toward the sump N and communicates with sump N through passage 370. This passage 261 also communicates with bearing 14 and a clearance space around shaft 11. Shaft 11 and leakage fluid from the agitator motor I is communicated to key slot 159 and thence through the shaft keyways 162 to the bearing 14.

Radially inward leakage fluid from the spin motor J flows to the bearing 14 and thence to sump passage 261.

DIRT TRAPS

Hydraulic apparatus of the type herein described normally has difficulty with small particles of dirt which are either not fully flushed out of the device at the time of manufacture or for one reason or another break off and enter the fluid stream when the device is in operation. Heretofore, it has been conventional to provide filters to remove any such dirt.

The present invention instead provides what may be termed "dirt traps" associated with all of the surfaces which are in sliding engagement. These dirt traps, in essence, consist of a groove or recess in one of the surfaces extending at least partway across the surface in a direction generally transverse to the relative line of movement. If there is no pressure differential across the surfaces, the recess may extend all the way across the surface. If there is a pressure differential, the recess extends transversely part way across the surface and a second recess is provided across the rest of the surface but spaced from the first recess along the line of movement. These recesses are then communicated directly to a fluid passage either at high or low pressure.

Manifold plate 72 shows the use of dirt traps where a pressure differential exists transversely to the line of movement. Here manifold 75 is provided with a notch 75a extending radially outwardly therefrom a distance approximately one half the distance between the outer wall of the manifold 75 and the outer edge 77. In a like manner, outer edge 77 has a notch 77a circumferentially spaced from notch 75a and extending radially inwardly a distance such as to overlap radially with notch 75a.

Manifold 75 also has a radially inwardly extending notch 75b and shaft opening 71 has a notch 71a extending radially outwardly. These notches 71a, 75b are circumferentially spaced but overlap in a radial direction. Manifold 76 has an identical arrangement of notches.

Manifolds 66, 67 in the lower surface 42 also have similar notches.

Groove 134 on shaft 11, a vertically extending groove in the outer surface of shaft 10 (not shown), grooves 121a, 123a from manifolds 110, 111 respectively, and grooves 163 in agitator motor J all function as dirt traps, each communicating with free flowing hydraulic fluid. Thus any dirt which might move between sliding surfaces will be scraped off into the respective dirt trap and allowed to flow through the various passages and ultimately settle out in the sump N.

OPERATION—START UP

To describe the operation of the transmission, it will be assumed that: water is in the tub A to the desired level, clothes are in the basket C in an amount not exceeding the design load of the laundry machine, and all chambers and passages in the housing are completely filled with hydraulic fluid. The sump N is partly filled to a level 20.

The switch 56 is placed in the agitate position, and the motor G is energized and commences to rotate in a counterclockwise direction as viewed in FIGURE 3. Hydraulic fluid commences to flow from the pump through manifold port 66a, passage 66b, chamber 66e, valve passage 256, valve chamber 110e and thence, through passages 67b, 67a to pump inlet manifold 67. As outlet is connected to inlet of the pump, the motor G starts without any appreciable load thereon.

Figure 6:
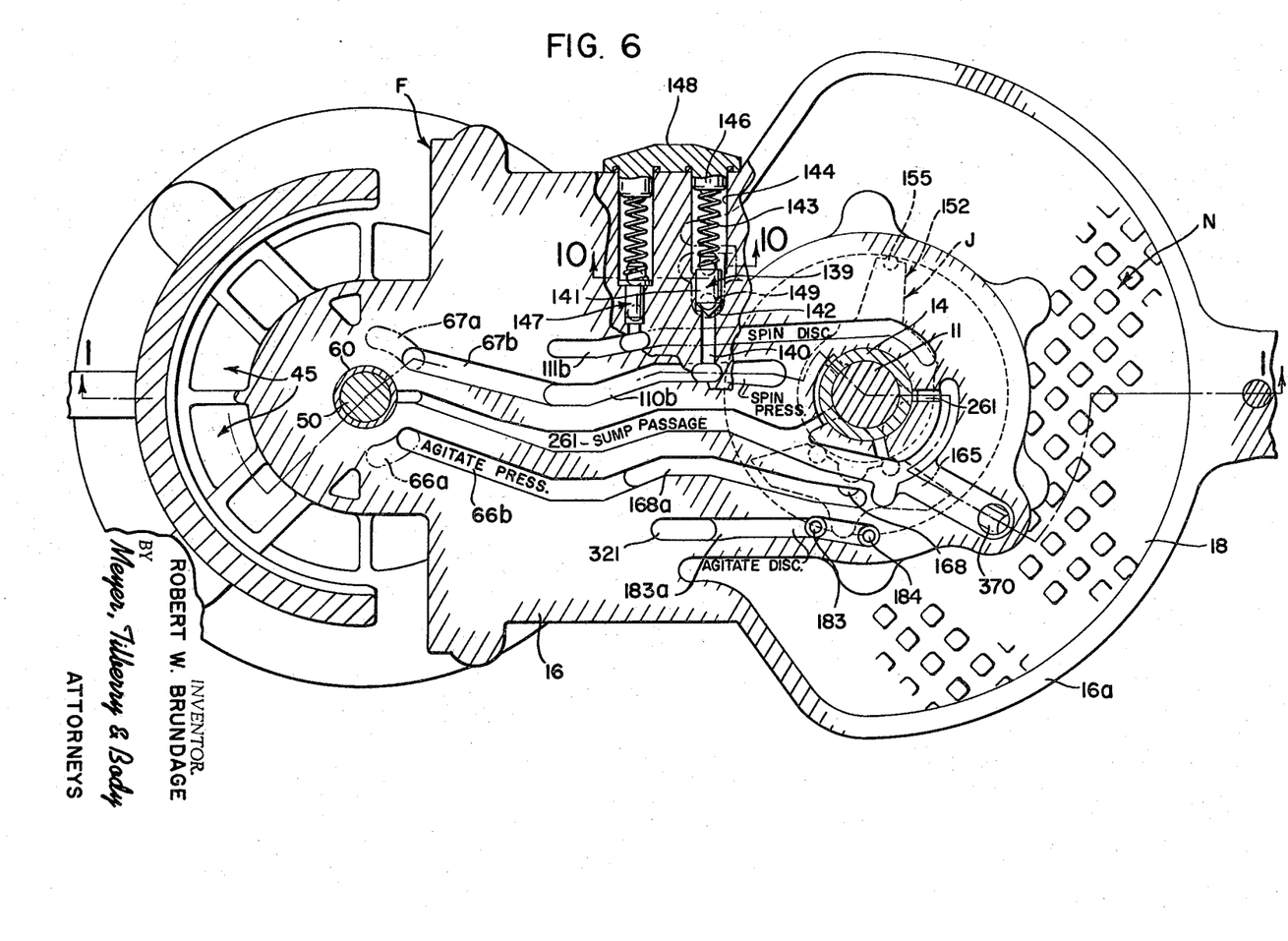
FIGURE 6 is a cross-sectional view of FIGURE 1 taken approximately on the line 6—6 thereof and in effect is a downwardly looking elevational view of the lower housing half with portion broken away to show the spin pressure and spin brake relief valves in cross section and showing in dotted lines the members of the oscillating motor.
Figure 7:
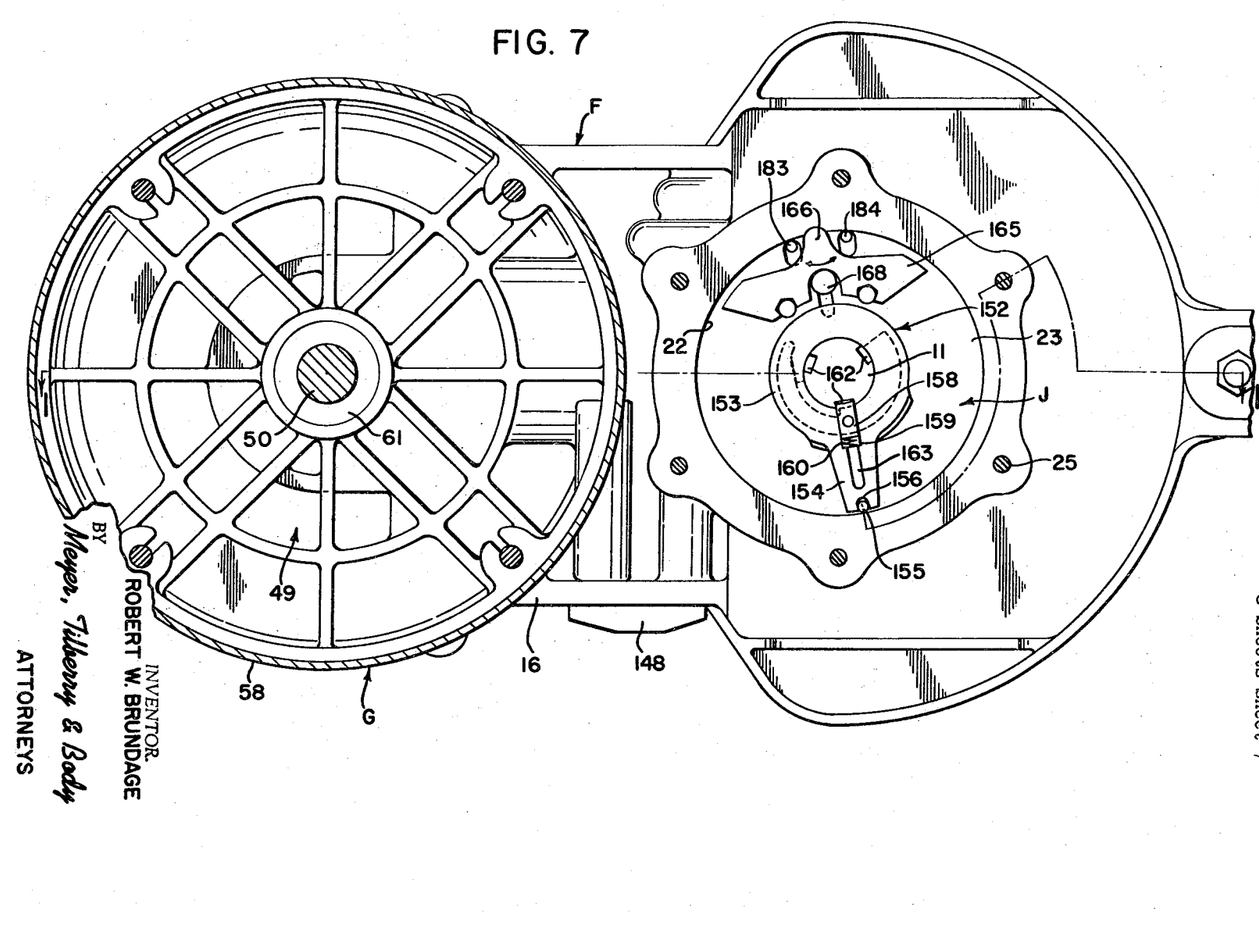
FIGURE 7 is a bottom elevational view of FIGURE 1 taken approximately on the line 7—7 thereof that with the agitating motor cover removed for the purposes of clarity.

The resistance to the flow of fluid through the valve passage 256 and back to the pump creates a slight pressure in passage 66b which is communicated to chamber 66f. At the same time, pump inlet port 67e is communicated to pump inlet manifold 67 through passage 67c. The suction in chamber 67e and the pressure in chamber 66f cause the piston to move down against the force of spring 290. As this occurs (see FIGURE 8), piston land 253 engages the cylinder land and the flow of fluid from chamber 66e to chamber 261c and 110e is cut off. The output of the pump then flows from chamber 66e through passage 168a (see FIGURE 6) to the inlet port 168 of agitator motor J. Pressure in chamber 66e immediately builds up and is communicated through passage 66c to the left end of valve piston 250. This pressure locks piston 250 in the right or agitate position.

OPERATION—AGITATE

Thereafter hydraulic fluid continues to flow through inlet port 168 of the agitator motor J and the vane oscillates as is described in my application, Ser. No. 303,905. Fluid being discharged, however, flows through passage 183a to throttle valve chamber 321, through recess 335 on throttle valve member 320 to valve chamber 322 and thence through passage 322a to the sump N. The operation of the throttle valve will be described hereinafter.

When the valve piston 250 moves to down agitate position, the outlet and inlet of the basket spin motor I are blocked so that the spin motor and basket are prevented from moving in either direction under the influence of the oscillations of the agitator. Makeup fluid for any fluid which leaks from this closed circuit is supplied through a check valve, not shown.

When it is desired to stop the agitating, the electric motor G is de-energized. The pressures all drop to zero and the valve piston 250 returns to the neutral position under the force of spring 290.

OPERATION—SPIN

When it is desired to cause the basket C to spin and centrifugally force the water out of the clothes, the switch 56 is placed in the spin position, and the motor G energized, which causes it to rotate in a clockwise direction as viewed in FIGURES 3, 8, 9. When this occurs, fluid flows from manifold port 67a through passage 67b, valve chamber 110e, valve passage 256, valve chamber 66e, passage 66b to the pump inlet manifold 66. The slight pressure created by the resistance to this flow is communicated to valve chamber 67e through passage 67c. At the same time, suction is created in manifold port 66 which is communicated to the valve chamber 67f, through passage 66c. This slight pressure and suction causes the valve piston 250 to move up until the piston land 252 sealingly engages the cylinder land. At this moment, the flow of fluid from the pump outlet manifold 67 to inlet manifold 66 is cut off. The pressure then increases in chamber 67e causing the valve piston 250 to move the remainder of the way to the up position.

The hydraulic fluid under pressure now flows through passage 110b to the inlet port 110a of basket motor I to cause this motor to start to rotate. Fluid discharged from spin motor I flows through passage 111b to valve chamber 111e, valve passage 257, valve chamber 68e, passage 302a, valve chamber 302, recess 315 on throttle valve 300, valve chamber 301, and passage 301c to the sump N. Operation of throttle valve 300 will be described hereinafter. Pressure relief valve 139 (which is set to operate at around 600 pounds per square inch) prevents excessive pressures from building up.

The basket continues to rotate until such time as the motor G is de-energized. This may occur at the end of a cycle and/or when the access door is opened. The valve piston 250 immediately returns to the neutral position and blocks the fluid being discharged from the basket motor I. Pressure relief valve 147 communicates passage 111b to the sump 20 and maintains a back pressure on the motor I to brake it to a stop. The rate of braking of the basket rotation is readily controlled by the characteristics of the valve 147.

It will be noted that all during this spinning operation, high pressure fluid has been circulating upwardly from the passage 130 through the passage 131 past the bearing 35 thence through the opening 133 and down past the bearing to the passage 136 where it is returned to the sump. Thus, the bearings are continuously flushed and lubricated during this spinning operation.

SPEED CONTROL, AGITATOR AND SPIN

The speed of the agitator motor J is controlled by flowing its discharging fluid through a variable orifice in the form of a throttle valve which in effect creates a back pressure on the motor discharge and then using this back pressure to open a pressure-actuated valve which bypasses or dumps some of the pump discharge either to the sump or to pump inlet. The valving may take a number of different forms. The figures show a compact inexpensive arrangement.

FIGURE 8 shows the operation when the agitator motor is operating. Thus the agitator motor discharge in flowing through recess 335 (which is an orifice) builds up a back pressure in chamber 321, which pressure creates a downward force on the dump valve member 340 causing it to move against the force of spring 350 (see FIGURE 8). Valve passage 349 communicates valve chamber 343 with valve chamber 342 and sump passage 261. As valve chamber 343 communicates with passage 66b, some of the pump discharge is communicated to the sump. As less than the full volume of pump discharge is being supplied to the agitator motor J, the speed of the agitator motor J will be something less than its maximum. By rotating throttle valve member 320, the size of the passage (or orifice) between chambers 321 and 322 can be varied which varies the back pressure on the agitator motor and thus the amount that sump valve member 340 is moved downwardly and the amount of pump discharge which is bypassed back to inlet.

FIGURE 9 shows the speed control of the spin motor. In this instance the discharge from the spin motor I as previously pointed out flows from valve chamber 111e to valve chamber 68e, passage 302a to the valve chamber 320 thence through recess 315 to passage 301a and the sump N. As the size of recess 315 is varied, the back pressure on the spin discharge motor I is also varied and this pressure forces the dump valve member 340 against the force of spring 351 upwardly to communicate the discharge ports 67b of the pump to the sump passage 261.

With the arrangement shown, the speed of oscillation of agitator motor J or of rotation of spin motor I may be individually controlled in an infinite number of steps from zero to maximum.

The arrangement described is particularly of value because the speed of the motors will be generally independent of the load placed thereon. This is so because the speed is controlled entirely by the amount of fluid being discharged from the manifolds of the motors, it being noted that any leakage fluid in the motor is fed directly back to the sump and does not pass through the throttle valve members. Thus, the output speed of a hydraulic motor without an internal leakage being supplied with a constant volume of hydraulic fluid is constant with variations in load. Depending upon the amount of internal leakage, the output speed will vary. However, if the leakage fluid is bypassed directly back to sump, the volume of fluid being discharged through the output manifold is directly proportional to the speed of the motor and the present invention uses this volume of fluid to control the amount of fluid which is bypassed from pump outlet to pump inlet. The pressure across the orifice varies as the square of the volume of fluid and the motor speed. The volume of fluid dumped is a direct function of the pressure and thus the square of the motor speed. A very stable speed control results.

It is further to be noted that the agitate speed control can be mechanically linked with the agitator so as to produce any desired wave form of speed versus time of the agitator as is described in copending applications, Ser. Nos. 308,760 and 308,850, both filed Sept. 13, 1963, and both now abandoned.

When the transmission is in operation, the pump inlet is always in communication with the sump N and discharge or leakage fluid may flow to either as equivalents.

Leakage fluid as used herein does not include that which leaks from high pressure to low pressure between the gear teeth or across lands.

The invention has been described in great detail sufficient to enable one skilled in the art of hydraulics and mechanics to duplicate the invention. Obviously, modifications and alterations of the preferred embodiment described will occur to others upon a reading and understanding of this specification, and it is my intention to include all such modifications and alterations as part of my invention insofar as they come within the scope of the appended claims.

Having thus described my invention, I claim:

1. A hydraulic transmission comprised of a reversible rotatable pump and a pair of hydraulic motors, valve means responsive to the direction of rotation of said pump for directly the discharge of said pump to either one or the other of said motors, adjustable valve means in the discharge of one of said motors operative to maintain the volume of discharge constant at any desired amount and bypass some of the discharge of said pump to its inlet.

2. The transmission of claim 1 wherein each motor has a separate valve means.

3. The transmission of claim 1 which includes a pressure actuated valve means biased to the closed position and which when open communicates said pump discharge to inlet, and wherein the adjustable valve means create a pressure in the motor discharge and said pressure opens said pressure actuated valve against said bias.

4. A hydraulic transmission comprised of a hydraulic pump having an outlet and an inlet, means rotating said pump at a substantially constant speed whereby said pump has a constant volume, variable-pressure output, a hydraulic motor having an inlet connected to the pump outlet and a throttle valve having an inlet connected to the motor outlet and an outlet connected to the pump inlet whereby to restrict the motor outlet and create a hydraulic pressure thereat, said motor having internal leakage and means for communicating said leakage directly to the pump inlet, a dump valve having an inlet connected to the pump outlet and an outlet connected to the pump inlet, said dump valve being actuated by said hydraulic pressure.

5. The transmission of claim 4 wherein said motor is an internal gear motor having an internally toothed gear rotating in a cylindrical bearing, means communicate the high pressure to selected places on said bearing and other means communicate another selected place on said bearing to the sump.

6. The transmission of claim 4 wherein said motor is a vane piston oscillating between parallel surfaces, the upper and lower surfaces of said piston each having a radially extending groove and means communicating said grooves to said sump.

7. A hydraulic transmission comprised of a hydraulic pump having an outlet and an inlet, means rotating said pump at a substantially constant speed whereby said pump has a constant volume, variable-pressure output, a hydraulic motor having an inlet connected to the pump outlet and a throttle valve having an inlet connected to the motor outlet and an outlet connected to the pump inlet whereby to restrict the motor outlet and create a hydraulic pressure thereat, a dump valve having an inlet connected to the pump outlet and an outlet connected to the pump inlet, said dump valve being actuated by said hydraulic pressure.

8. A speed control valve for a positive displacement hydraulic motor having an inlet and an outlet and comprised of a housing; a cylindrical bore in said housing having a plurality of lands and between said lands a first valve chamber communicating with the motor inlet, a second valve chamber communicating with the motor outlet and a third valve chamber communicating with low hydraulic pressure, a valve piston in said bore having a plurality of lands and valve passages between said lands, a throttle valve member in said bore having a land and a valve passage, said valve piston have a first position, closing communication between said first and second valve chambers and a second position communicating said first and second valve chambers, means biasing said piston to said first position, said throttle valve member being movable to variably communicate said second and third valve chambers whereby to restrict discharge of said motor and create a pressure in said second valve chamber, said pressure acting on said piston to move same against said biasing means to said second position.

9. A method of manufacturing a housing for hydraulic transmission comprising the steps of, providing a pair of housing members each having a flat surface adapted to be placed in sealed abutting relationship with the other, providing at least one of said surfaces with a plurality of hydraulic passages, providing at least one of said surfaces with a plurality of recesses deeper than said passages and in communication with said passages, drilling a valve member bore on an axis generally parallel to, but offset from, said surfaces and in communication with at least some of said passages, coating the flat surfaces of said members with a cement and placing said housing members in abutting sealed relationship with the cement being the sole means for holding said surfaces in abutting relationship.

10. A hydraulic pump or motor comprised of a housing having a recess defined by upper and lower generally planar surfaces and a cylindrical surface, at least one of said planar surfaces having manifolds therein leaving sealing lands therebetween, an internally toothed and externally toothed gear rotatably in said cavity on spaced but parallel axes, a shaft opening through one of said planar surfaces, a notch extending radially outwardly from each of said manifolds, a notch extending radially inwardly from each of said manifolds a distance approximately half-way towards the shaft opening, and notches extending radially outwardly from the shaft opening approximately one-half the distance toward said manifolds, said last-mentioned notches being circumferentially spaced from said first-mentioned notches.

11. A hydraulic transmission comprised of a housing having a portion defining a recess adapted to contain pumping members, said housing surrounding at least a part of said portion having a plurality of radially extending fins, an electric motor having a case fastened to said housing and having a shaft extending into said recess for driving the pumping members therein, said case having a plurality of openings generally aligned with and close to said fins, and fan means in said motor case for moving air through said openings and over said fins.

12. The transmission of claim 11 wherein said transmission housing is generally elongated and said fins are at one end, said case includes additional openings facing along a side of said housing and said fan means move said air along the side of said housing.

13. A housing for a laundry machine transmission comprised of a pair of members each having a surface in sealed abutting relationship with the other, said surfaces having a plurality of passages formed therein for intercommunicating parts of said transmission and both having a relatively deep recess aligned with each other forming a sump for said transmission, said housing having a pair of vertically aligned recesses defining motor cavities, said sump surrounding approximately 180° of said recesses with the upper and lower surfaces of said sump being at least co-extensive with the upper and lower surface of said housing and the width of said sump being at least as great as the remainder of the housing.

References Cited
UNITED STATES PATENTS

| | | | |
|---|---|---|---|
| 2,381,842 | 8/1945 | Schwend | 60—53 |
| 2,635,586 | 4/1953 | Kuhn | 60—52 X |
| 2,640,426 | 6/1953 | McLeod | 60—52 X |
| 2,672,730 | 3/1954 | Devaud | 60—52 |
| 2,693,824 | 11/1954 | Harrington et al. | 60—52 X |
| 2,793,499 | 5/1957 | Patch | 60—52 |
| 3,063,423 | 11/1962 | Riordan | 92—86 X |
| 3,303,752 | 2/1967 | Shook et al. | 60—52 X |

EDGAR W. GEOGHEGAN, *Primary Examiner.*